United States Patent Office 3,065,240
Patented Nov. 20, 1962

3,065,240
THIAZOLES
Miklos Bodanszky, Princeton, and John T. Sheehan, Middlesex, N.J., assignors to Olin Mathieson Chemical Corporation, New York, N.Y., a corporation of Virginia
No Drawing. Original application Aug. 3, 1960, Ser. No. 47,129, now Patent No. 3,040,054, dated June 19, 1962. Divided and this application Sept. 12, 1961, Ser. No. 137,495
3 Claims. (Cl. 260—302)

This application is a division of our application, Serial No. 47,129, filed August 3, 1960, now Patent No. 3,040,-054.

This invention relates to new chemical compounds and more particularly to a new thiazolecarboxylic acid of the formula

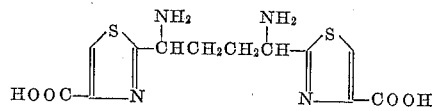

and salts thereof. Since the thiazolecarboxylic acid contains both basic (i.e. amino) groups and carboxylic acid groups it is amphoteric in nature and thus forms salts with acids and bases. Although any acid or base may be used in preparing the salts, the preferred acids are mineral acids, such as the hydrohalic acids (e.g., hydrochloric and hydrobromic acid), sulfuric acid, nitric acid and phosphoric acid. The preferred bases are ammonium hydroxide, alkali metal hydroxides (e.g., potassium hydroxide and sodium hydroxide) and alkaline earth metal hydroxides (e.g., calcium hydroxide). In addition organic acids, such as tartaric, citric and acetic acid, and organic bases such as alkylamines, can be used.

The new thiazolecarboxylic acid of this invention (as well as its salts) is useful as a precursor in the microbial preparation of the antibiotic thiostrepton. For this purpose it is added at a concentration greater than about 0.001% (w./v.) to a nutrient medium containing a source of carbon and energy, a source of assimilable nitrogen and a source of assimilable sulfur (such as that described in U.S. patent application, Serial No. 491,392, filed March 1, 1955, and now U.S. Patent No. 2,982,689, granted May 2, 1961) when culturing *Streptomyces azureus* (Waksman Collection No. 3705, Institute of Microbiology, New Brunswick, New Jersey) for the production of thiostrepton.

The final products of this invention are prepared by a series of reactions using as the initial reactant succinaldehyde. These reactions are shown schematically by the following equations. In these equations, R is a hydrocarbon radical of less than ten carbon atoms, such as lower alkyl (e.g., methyl, ethyl, propyl, butyl and hexyl), aryl (e.g., phenyl, p-tolyl and o,p-xylyl), aralkyl (e.g., α-tolyl, phenethyl and 2-phenyl-propyl), and cycloalkyl (e.g., cyclopentyl and cyclohexyl); and R′ is a saturated hydrocarbon radical of less than ten carbon atoms, such as lower alkyl (e.g., methyl, ethyl, propyl and butyl). Each of the intermediates formed is a new compound of this invention. In addition to their use as intermediates, Compounds IV and V can also be used as precursors in the production of thiostrepton.

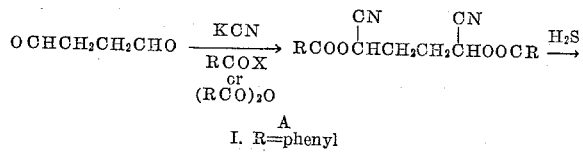

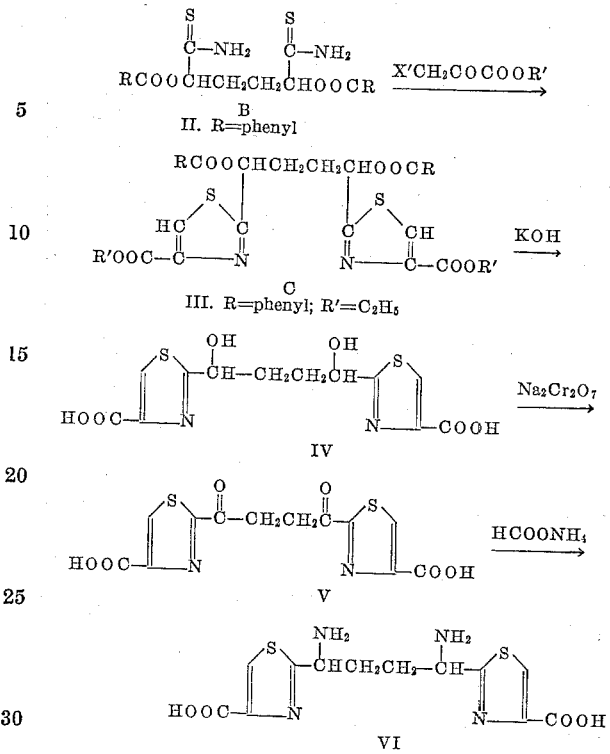

To prepare Compounds A, succinaldehyde is interacted with a cyanide, such as an alkali metal cyanide (e.g., potassium cyanide), and an acylating agent of either the formula RCOX or (RCO)$_2$O, wherein R is as hereinbefore defined, and X is a halide, preferably chloride. The reaction is conducted in an aqueous medium preferably in the cold, and results in the preparation of the two isomers of the diesters of 2,5-dihydroxyhexanedinitrile. In compounds A, the acid moiety of the ester is one corresponding to the acylating agent used.

To prepare Compounds B, either of the isomers of Compound A is treated with hydrogen sulfide, the reaction preferably being conducted under basic conditions. The reaction results in the preparation of Compounds B, the diesters of 2,5-dihydroxydithiohexanediamide, wherein the acid moiety of the ester corresponds to the acylating agent used in the first step of the process.

Compounds B are then condensed with an ester of halopyruvic acid of the formula: X′CH$_2$COCOOR′, wherein X′ is halo, perferably bromo, and R′ is as hereinbefore defined. The reaction is preferably conducted in an organic solvent at an elevated temperature, such as the reflux temeprature of the solvent, and results in the preparation of Compounds C, wherein R and R′ are as hereinbefore defined.

Compounds C are then hydrolyzed in the usual manner, as by treatment with a base, such as an alkali metal hydroxide (e.g., potassium hydroxide) to yield Compound IV, 2,2′-(1,4 - dihydroxytetramethylene)bis-(4-thiazolecarboxylic acid).

Compound IV is then oxidized by treatment with sodium dichromate to give Compound V, 2,2′-succinylbis(4-thiazolecarboxylic acid).

Compound V is then treated with ammonium formate at an elevated temperature and the resulting formyl derivative hydrolyzed, as by treatment with a mineral acid to yield one of the final compounds of this invention, Compound VI, 2,2′-(1,4 - diaminotetramethylene)bis(4-thiazolecarboxylic acid) which can be converted to a salt in the usual manner by treatment with the desired acid or base.

The following examples illustrate the processes of this invention (all temperatures being in centigrade):

EXAMPLE 1

*Benzoic Acid, Diester with 2,5-Dihydroxyhexanedinitrile (I)*

A mixture of 30 g. of succinaldehyde, 750 g. of cracked ice, 44 g. of potassium cyanide and 94 g. (78 ml.) of benzoyl chloride is stirred for 1 hour. A milky semisolid separates from the reaction mixture. The mixture is filtered by suction, and the white solid residue washed with water to give on drying about 15 g. Solid I. The original filtrate of the reaction mixture is extracted four times with 250 ml. portions of chloroform and the combined chloroform extract washed first with a solution containing 60 g. of sodium bicarbonate in 750 ml. of water and finally with three portions of 250 ml. of water. The chloroform extract is dried over anhydrous magnesium sulfate and after removing the latter and evaporating the solvent a residue of about 62 g. of heavy liquid remained. This residue on treatment with several volumes of hexane gives about 19 g. of Solid II.

Solids I and II are separately treated with ether, from which extracts benzoic acid is recovered. The ether insoluble materials are treated with toluene on the steam bath and from these extracts a material, M.P. about 134–136°, separates.

*Analysis.*—Calc'd for $C_{20}H_{16}N_2O_4$: C, 68.96; H, 4.63; N, 8.04. Found: C, 68.89; H, 4.60; N, 7.93.

The toluene matrials are then treated with dimethylformamide on the steam bath and solution is complete. On cooling a crystalline product melting at about 214–216° separates.

*Analysis.*—Found: C, 68.96; H, 4.81; N, 8.10.

The infrared spectra of both compounds are substantially the same.

EXAMPLE 2

*Benzoic Acid, Diester with 2,5-Dihydroxydithiohexanediamide (II)*

Into a solution of 4.6 g. of the lower melting dinitrile obtained in Example 1 in 25 ml. of dimethylformamide containing 0.3 ml. of triethanolamine is bubbled hydrogen sulfide for six hours. After the addition of gas, the stoppered mixture is allowed to stand for 24 hours. The mixture is then treated with hexane and enough ethanol to make the mixture homogeneous. On standing a yellow solid slowly separates. Ultimately with scratching and further diluting with hexane and ethanol about 5 g. of product is obtained. The product is crystallized from large volumes of boiling ethanol and melts at about 203–205°.

*Analysis.*—Calc'd for $C_{20}H_{20}N_2O_4S_2$: N, 6.73; S, 15.37. Found: N, 6.94; S, 15.40.

EXAMPLE 3

*2,2' - (1,4-Dihydroxytetramethylene)Bis(4 - Thiazolecarboxylic Acid Diethyl Ester, Diester with Benzoic Acid (III)*

A mixture of 2.5 g. of the dithioamide obtained in Example 2 and 2.5 g. of ethyl bromopyruvate in 100 ml. of ethanol is heated under reflux for one and one-half hours on the steam bath. On cooling a solid separates. The solid is filtered off to yield about 2.9 g. of solid, which is crystallized from 100 ml. of boiling ethanol. The product melts at about 144–145°.

*Analysis.*—Calc'd for $C_{30}H_{28}N_2O_8S_2$: N, 4.60; S, 10.52. Found: N, 4.68; S, 10.61.

EXAMPLE 4

*2,2' - (1,4-Dihydroxytetramethylene)Bis(4 - Thiazolecarboxylic Acid) (IV)*

2.1 g. of the ester obtained in Example 3 is suspended in 50 ml. of absolute ethanol and 0.76 g. of potassium hydroxide in 5 ml. of absolute ethanol is added. While stirring at room temperature solution occurs within one-half hour. The mixture is allowed to stand at room temperature overnight during which time a solid separates out. The insoluble material is filtered off and washed with ethanol. It is dissolved in 10 ml. of water and the aqueous solution then washed with ether and then acidified with 1N hydrochloric acid. From the acid solution a precipitate slowly formed which is filtered off, washed with water, and air dried to give about 1.0 g. of product, M.P. about 235–240°. From the original mother liquor on evaporation a residue of about 1.6 g. of product is obtained. The residue is dissolved in 10 ml. of water and after washing the aqueous solution with ether, the aqueous solution is acidified with hydrochloric acid and the precipitate which forms filtered off. This material is benzoic acid. From this and the previous acid solution however, on cooling and standing about 0.2 g. additional product separates. Crystallized from boiling water, this compound separates out with one mole of water of crystallization which is lost on drying at 130°. The compound, 2,2' - (1,4 - dihydroxytetramethylene)bis(4-thiazolecarboxylic acid) melts at about 240–242° (dec.).

*Analysis.*—Calc'd for $C_{12}H_{12}N_2O_6S_2$: C, 41.87; H, 3.51. Found: C, 42.01; H, 3.95.

EXAMPLE 5

*2,2'-Succinyl Bis(4-Thiazolecarboxylic Acid) (V)*

600 mg. of the diol acid obtained in Example 4 is suspended in 15 ml. of glacial acetic acid distilled from chromium trioxide, and 500 mg. of sodium dichromate in one-half a cubic centimeter of water is added to the suspension. The whole is kept at 100° for 2 hours. On cooling an insoluble material settles out. This material is filtered off and washed with a large amount of water and some dilute acetic acid. It weighs about 400 mg. After crystallization from dimethylformamide the 2,2'-succinyl bis(4-thiazolecarboxylic acid) has a M.P. of about 284–286° (dec.).

*Analysis.*—Calc'd for $C_{12}H_8N_2O_6S_2$: C, 42.36; H, 2.37. Found: C, 42.52; H, 2.90.

EXAMPLE 6

*2,2'-(1,4-Diaminotetramethylene)Bis-(4-Thiazolecarboxylic Acid) (VI)*

100 mg. of the diketo acid obtained in Example 5 is intimately mixed with 2.0 g. of ammonium formate in a Claisen type distilling flask. The flask is heated in an oil bath at an internal temperature of 150–155° until the initial foaming reaction subsides. The internal temperature is then gradually raised to 185–190° where it is kept for 3 hours. On cooling the residue is taken up in 25 ml. of water and any insoluble material removed via filtration. The filtrate is acidified with hydrochloric acid whereupon a precipitate separates out. It is filtered off and washed with water to yield a mixture of formyl derivatives. This mixture is heated under reflux with 5 ml. of concentrated hydrochloric acid for an hour. Hydrolysis proceeds and the mixture becomes homogeneous. On evaporation the residue obtained is dissolved in water from which VI slowly separates. It melts at about 235–237° (dec.). Calc'd for $C_{12}H_{14}O_4N_4S_2$: C, 42.1; H, 4.12; N, 16.4; S, 18.7. Found: C, 42.5; H, 4.29; N, 16.4; S, 18.8. On Whatman No. 1 paper in a system of n-butanol-acetic acid-water (4:1:1) the acid moves faster than cystine, RF 0.008–0.10.

EXAMPLE 7

*2,2'-(1,4-Diaminotetramethylene)Bis(4-Thiazolecarboxylic Acid), Dihydrochloride*

40 mg. of 2,2'-(1,4-diaminotetramethylene)bis(4-thiazole carboxylic acid) is dissolved in warm N-hydrochloric acid. The dihydrochloride salt which forms slowly separates from solution and is removed by filtration.

EXAMPLE 8

*2,2'-(1,4-Diaminotetramethylene)Bis(4-Thiazolecarboxylic Acid), Ammonium Salt*

30 mg. of 2,2'-(1,4-diaminotetramethylene)bis(4-thiazolecarboxylic acid) is dissolved in an excess of ammonium hydroxide. Evaporation of the solvent yields the ammonium salt.

The invention may be variously otherwise embodied within the scope of the appended claims.

What is claimed is:

1. The diester of 2,2'-(1,4-dihydroxytetramethylene)bis(4-thiazolecarboxylic acid) di(lower alkyl) ester with a hydrocarbon carboxylic acid of less than eleven carbon atoms.

2. The diester of 2,2'-(1,4-dihydroxytetramethylene)bis(4-thiazolecarboxylic acid diethyl ester) with benzoic acid.

3. 2,2'-(1,4-dihydroxytetramethylene)bis(4-thiazolecarboxylic acid).

References Cited in the file of this patent

UNITED STATES PATENTS

| | | |
|---|---|---|
| 2,731,489 | Stansbury et al. | Jan. 17, 1956 |
| 2,816,130 | Selcer et al. | Dec. 10, 1957 |
| 2,840,594 | Coates et al. | June 24, 1958 |
| 2,853,512 | Isler et al. | Sept. 23, 1958 |
| 2,937,196 | Kordak et al. | May 17, 1960 |
| 2,961,446 | Harman et al. | Nov. 22, 1960 |
| 3,002,977 | D'Amico | Oct. 3, 1961 |

FOREIGN PATENTS

| | | |
|---|---|---|
| 247,990 | Switzerland | Jan. 3, 1948 |

OTHER REFERENCES

Beauvalet: Chem. Abstracts, volume 44, column 1417 (1950).

Karrer: "Organic Chemistry" (Elsevier), page 212 (1950).

Elvidge et al.: Chem. Abstracts, volume 47, column 1058 (1953).

Elderfield: "Heterocyclic Compounds," volume 5, pages 624–5 (1957).